June 19, 1956  W. L. GASKELL  2,750,970
GAUGE FOR INDICATING LINE OF CUT OF POWER DRIVEN TOOL
Filed Dec. 11, 1953  3 Sheets-Sheet 2

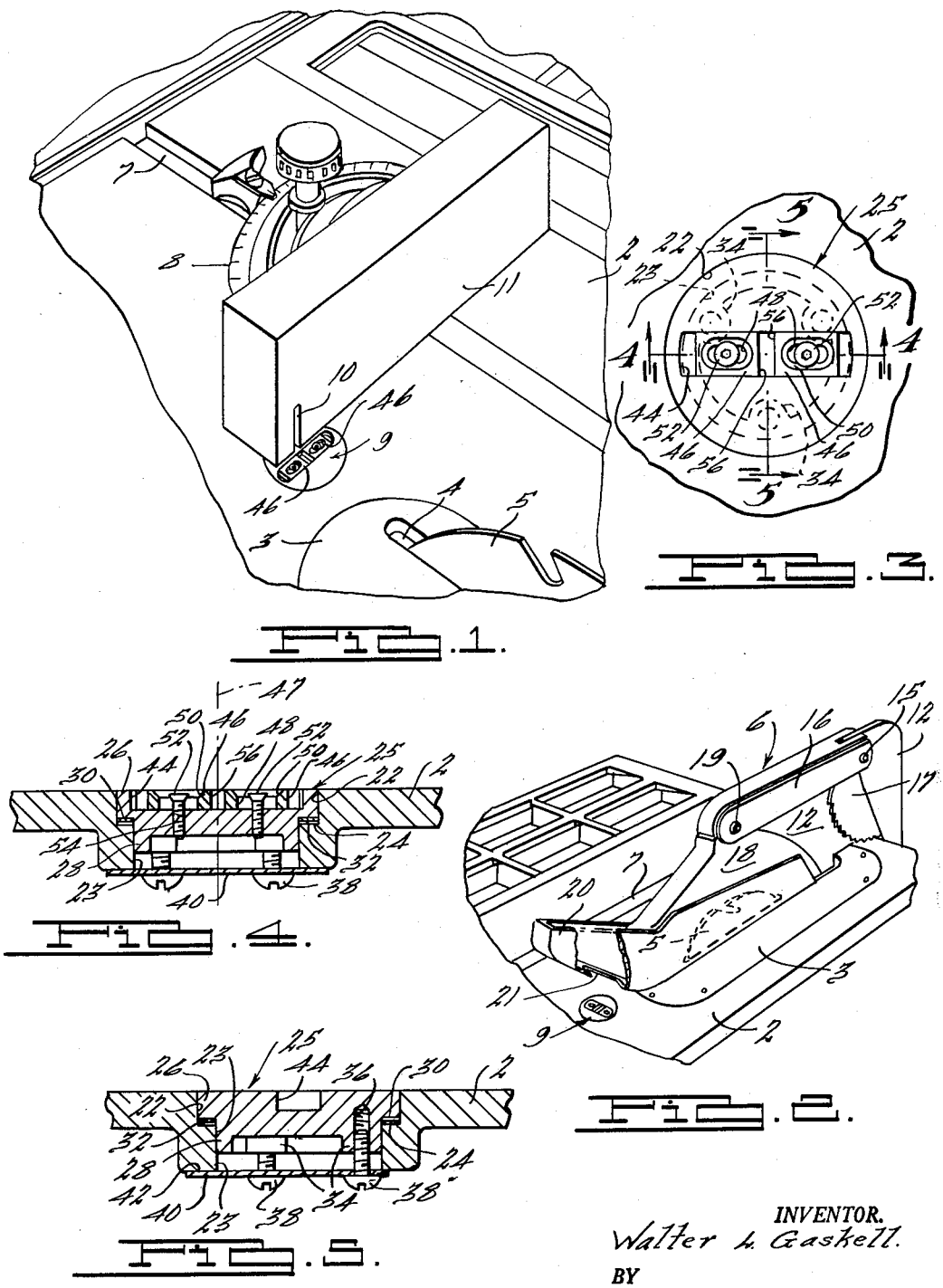

INVENTOR.
Walter L. Gaskell.
BY
Harness, Dickey & Pierce.
ATTORNEYS.

June 19, 1956   W. L. GASKELL   2,750,970
GAUGE FOR INDICATING LINE OF CUT OF POWER DRIVEN TOOL
Filed Dec. 11, 1953   3 Sheets-Sheet 3

INVENTOR.
Walter L. Gaskell
BY
Harness, Dickey & Pierce
ATTORNEYS

United States Patent Office 2,750,970
Patented June 19, 1956

2,750,970

GAUGE FOR INDICATING LINE OF CUT OF POWER DRIVEN TOOL

Walter L. Gaskell, Ypsilanti, Mich., assignor to King-Seeley Corporation, Ann Arbor, Mich., a corporation of Michigan Application December 11, 1953, Serial No. 397,533

19 Claims. (Cl. 143—168)

This invention relates to an adjustable kerf gauge which will indicate the exact cutting path of a woodworking tool such as an arbor saw, band saw, or the like.

In woodworking, it is often essential that close dimensions be held, and that many workpieces of a uniform size be cut. In order to accomplish this, it is necessary to either make a number of trial cuts or to have some kind of a gauge which will enable the machine operator to accurately correlate the position of the workpiece relative to the cutting tool. Accordingly, it is a primary object of the invention to provide an adjustable kerf gauge for woodworking machines and the like, which is capable of being adjusted to indicate to a machine operator the exact line and width of cutting action of the cutting tool, thereby enabling the operator to position a workpiece relative to a guarded cutting tool so that a scribed line on the workpiece can be accurately gauged to either side of the cutting tool, whereby extremely accurate dimensions may be obtained without resorting to numerous trial cuts and without removing the guard from the cutting tool.

A further object of the invention is to provide an adjustable kerf gauge which is capable of accurately indicating both edges of the line of cutting action of a machine tool and which may be embedded in the surface of the work table of the machine or which may be embedded in a separate housing adapted to be mounted in the work table of the machine.

Other objects, features, and advantages of the present invention will become apparent from the following description taken in conjunction with the drawings wherein:

Figure 1 is a fragmentary isometric view of the work table of a woodworking arbor saw provided with an adjustable kerf gauge made in accordance with the principles of the invention;

Fig. 2 is a fragmentary isometric view of a woodworking arbor saw provided wtih an adjustable kerf gauge and a saw guard adapted to coact with the gauge in a sawing operation;

Fig. 3 is an enlarged plan view of the adjustable kerf gauge illustrated in Figs. 1 and 2, and showing a fragmentary portion of the work table surrounding the gauge;

Fig. 4 is an elevational sectional view of the structure illustrated in Fig. 3, taken on the line 4—4 thereof;

Fig. 5 is an elevational sectional view of the structure illustrated in Fig. 3, taken on the line 5—5 thereof;

Figure 6:
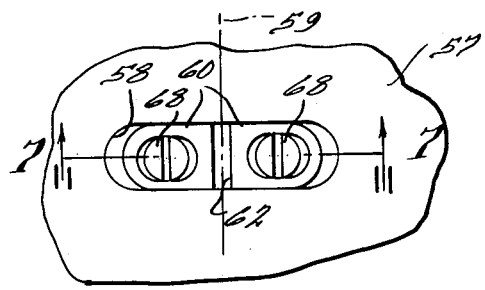
Fig. 6 is a fragmentary plan view of a machine tool work table in which is embedded a second embodiment of an adjustable kerf gauge made in accordance with the invention.

Referring now to the drawings, and particularly to Figs. 1 and 2, the numeral 2 designates a work table, for a woodworking machine, which is provided with a detachable plate 3 having a slot 4 through which protrudes an arbor saw 5. The work table 2 is provided with a longitudinal slot 7, in the upper surface thereof, in which is slidably mounted an adjustable miter gauge 8. Embedded in the work table 2 is an adjustable kerf gauge 9 adapted to indicate the width of cut, as 10, which the arbor saw 5 makes in a workpiece as 11.

As shown in Fig. 2, a saw guard assembly 6 is provided which includes a splitter 12 suitably secured to the tilting mechanism of the saw. A suitable means, as pin 15, is provided on the upper rear portion of the splitter 12 to hingedly support a forwardly extending arm 16 and a pair of anti-kickback pawls 17. The arm 16 is channel-shaped in cross section and the pawls 17 are mounted on opposite sides of the splitter 12. A hollow saw guard 18 is hingedly supported on the forward end of arm 16, as by means of pin 19, and is adapted to enclose the saw blade 5. The saw guard forward or handle portion 20 is provided with a vertical aperture therethrough, as 21, which is disposed over the kerf gauge 9, in alignment therewith, whereby gauge 9 may be viewed through aperture 21 to align a workpiece, as 11, with the kerf of saw blade 5 without removing the guard 6.

As is best seen in Figs. 3, 4 and 5, the work table 2 is provided with a stepped vertical aperture therethrough including an upper enlarged diameter portion as at 22 and a lower reduced diameter portion as at 23, which are joined by a horizontal surface or seat 24. Detachably mounted in the stepped aperture is an adjustable kerf gauge, as 9, which comprises a stepped, cylindrical housing 25 having an upper enlarged diameter portion 26 and a lower reduced diameter portion 28 joined by an annular shoulder portion 30. The housing 25 is adapted to be slidably received in the stepped aperture with the upper portion 26 seated in the enlarged aperture portion 22, the reduced housing portion 28 seated in the reduced aperture portion 23, and with the annular shoulder portion 30 of the housing supported by the seat portion 24. As is best seen in Figs. 4 and 5, an annular wave type spring washer 32 is adapted to engage the seat 24 and to also engage the annular shoulder 30 of the housing 25. The lower surface of the gauge housing 25 is provided with three downwardly extending projections as at 34 which are provided with vertically disposed threaded bores 36. The gauge housing 25 is detachably secured in the work table 2 by means of a plurality of machine screws as 38 which are adapted to be mounted in a retaining plate as 40 and disposed so as to engage the threaded bores 36. It will be appreciated that by turning the screws 38 into the threaded bores 36, the retaining plate 40 will be drawn upwardly and into an abutting position with the lower surface of the work table 2, as indicated at 42, whereby the annular shoulder 30, of the gauge housing 25, will be drawn downwardly against the annular spring washer 32 and into a fixed engagement therewith. It will be seen that the wave-type spring washer 32 eliminates the need for close dimensional tolerances in order to keep the top of the gauge housing 25 flush with the surface of the work table 2.

The upper surface of the gauge housing 25 is provided with an elongated, substantially rectangular recess 44 which is disposed so as to be transversely positioned relative to the line of cutting action of the saw blade 5. Slidably mounted in the transverse recess 44 on a common axis is a pair of gauge shoes 46 which are disposed on opposite sides of the centerline 47 of the line of cutting action of saw blade 5. As is best seen in Figs. 3 and 4, each gauge shoe 46 is provided with a longitudinal slot 48 therethrough having an upper countersunk portion 50. Each of the gauge shoes 46 is adapted to be fixedly secured to the gauge housing 25 as by means of a machine screw 52, which is mounted in the slot 48 and extends therethrough and threadably engages the bore 54 in the gauge housing 25. It will be seen that by loosening the screws 52, the gauge shoes 46 may be adjusted in the recess 44 so as to have their inner edges or indicating means 56 aligned with the edges of the cutting path of the saw blade 5, whereby the distance between the gauge shoe edges 56 will indicate the kerf of the saw blade 5. The gauge shoes 46 may be made from any suitable material, but are preferably made from either a suitable plastic, or are die cast from a suitable metal.

In operation, in order to set the gauge shoes 46 at the proper distance from the centerline 47 of the cutting path of the saw blade 5, the screws 52 are loosened to permit the gauge shoes 46 to be adjusted. A workpiece, as 11, is then held against the miter gauge 8 in a position transverse or 90° to the cutting path of the blade 5, as illustrated in Fig. 1. With the workpiece 11 held in such position, the miter gauge 8 is moved forwardly toward the rotating saw blade 5 and into engagement therewith so as to produce a saw cut as 10. The protractor and workpiece are then withdrawn from the saw blade 5 until the saw cut 10 is approximately in line with the gauge shoes 46, as shown in Fig. 1. The gauge shoes 46 may then be adjusted in the recess 44 so as to have the inner indicating edges 56 thereof exactly lined up with the sides of the saw cut 10, and the screws 52 are then tightened. The setting of the gauge shoes 46 may be rechecked by making a second saw cut in the workpiece 11 and then retracting the workpiece to see if the sides of the second saw cut and the indicating edges 56 of the gauge shoes are accurately aligned.

After the kerf gauge 9 has been set, a cut may be accurately made in a workpiece in relation to a selected mark on the workpiece by first holding the workpiece against a suitable means, as miter gauge 8, and adjusting the workpiece relative to the kerf gauge 9. The miter gauge and workpiece are then moved forward against the saw blade 5 and the desired cut will be made accurately and in a minimum of time without the necessity of any trial cuts. The saw guard 16 may be down and operating throughout the aligning and cutting action, since the aperture 21 permits vision of the kerf gauge 9 and the pins 15 and 19 permit the guard 16 to pivot upwardly, whereby the workpiece can be slid under the guard and against the saw blade 5.

Figure 7:
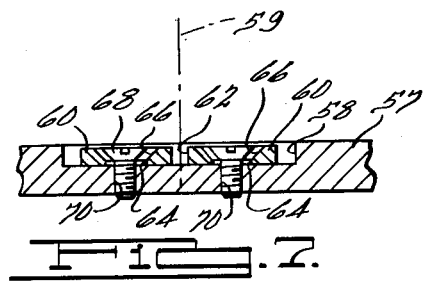
Fig. 7 is an elevational sectional view of the structure illustrated in Fig. 6, taken on the line 7—7 thereof.

A second embodiment of the invention is illustrated in Figs. 6 and 7. The numeral 57 designates a fragmentary portion of a machine tool work table which is provided with an elongated recess 58 on the upper surface thereof, disposed transversely to the center line 59 of the line of cutting action of the saw blade. Slidably mounted in the slot 58, on a common axis, is a pair of gauge shoes 60 which are adapted to be releasably fixed in the recess 58 so as to have the forward indicating edges 62 spaced to indicate the kerf of the saw blade. Each gauge shoe 60 is provided with a longitudinal slot 64 therethrough, the upper end of which is countersunk as at 66 so as to receive the head of a machine screw as 68. The machine screws 68 are each adapted to be mounted in one of the slots 64 and to threadably engage a vertical bore 70 in the work table 57. In operation, the inner edges or indicating means 62 of the gauge shoes 60 are adjusted and secured relative to the centerline 59 of the cutting path of a saw blade, in the manner as set forth hereinbefore for the embodiment of Fig. 1. The gauge shoes 60 may be made from any suitable material but are preferably made from either a suitable plastic, or are die cast from a suitable metal.

Figure 8:
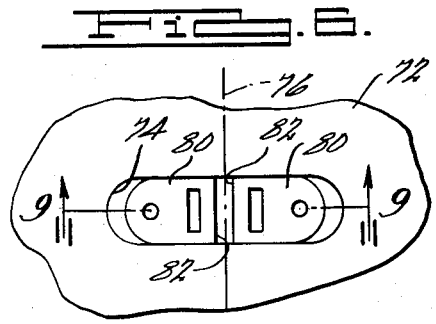
Fig. 8 is a fragmentary plan view of a machine tool work table in which is embedded a third embodiment of an adjustable kerf gauge made in accordance with the invention.
Figure 9:
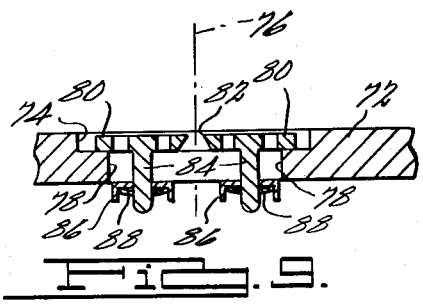
Fig. 9 is an elevational sectional view of the structure illustrated in Fig. 8, taken on the line 9—9 thereof.

A third embodiment of the invention is illustrated in Figs 8 and 9. The numeral 72 designates a fragmentary portion of a machine tool work table which is provided with an elongated recess 74, on the upper surface thereof, which is disposed transversely to the centerline 76 of the line of cutting action of the saw blade. The work table 72 is provided with a pair of vertical apertures as 78, disposed on opposite sides of and meeting at the kerf centerline 76, which communicate with the transverse recess 74. Slidably mounted in the recess 74, on a common axis, is a pair of gauge shoes 80, which are each provided with an indicating edge 82 adapted to be set on opposite sides of the kerf centerline 76, to indicate the edges of the cutting path of the saw blade. Each gauge shoe 80 is provided with a depending portion 84 which is threaded and adapted to slide transversely in one of the elongated apertures 78. Each gauge shoe 80 is releasably secured in place by means of a channel member 86 which is slidably mounted on the depending portion 84, abutting the lower surface of the work table 72, and being held thereagainst by means of a speed nut 88. In operation, the gauge shoes 80 are adjusted in the same manner as are the gauge shoes 46 of the embodiment of Fig. 1, as described hereinbefore. The gauge shoes 80 may be made from any suitable material, but are preferably made from either a suitable plastic, or are die cast from a suitable metal.

Figure 10:
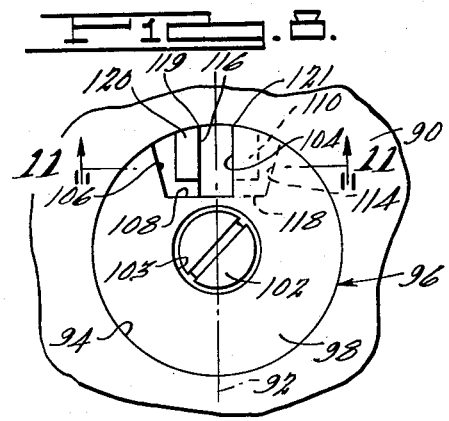
Fig. 10 is a fragmentary plan view of a machine tool work table in which is embedded a fourth embodiment of an adjustable kerf gauge made in accordance with the invention.
Figure 11:
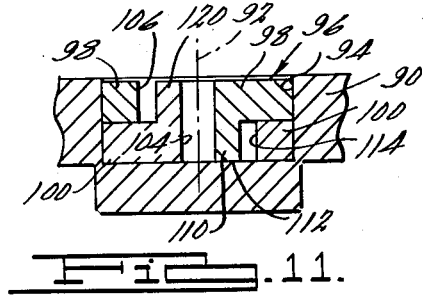
Fig. 11 is an elevational sectional view of the structure illustrated in Fig. 10, taken on the line 11—11 thereof.

A fourth embodiment of the invention is illustrated in Figs. 10 and 11. The numeral 90 designates a fragmentary portion of the work table of a machine tool provided with a cutting tool, such as a saw blade, having a line of cutting action as indicated by the centerline 92. The work table 90 is provided with a cylindrically shaped recess 94, in the upper surface thereof, in which is operatively mounted an adjustable kerf gauge 96 adapted to indicate the actual width of cut made by the cutting tool. The adjustable gauge 96 comprises an upper portion 98 and a lower portion 100, each of a thickness equal to about one half the depth of the recess 94, which are adapted to be slightly rotated relative to each other and to be releasably fixed in any selected relative position by means of a machine screw as 102 which is operatively mounted in the aperture 103 and threadably engages the machine tool work table 90. The upper gauge portion 98 is cylindrically shaped and is provided with an indentation or cut-out portion in the forward edge thereof in a direction facing the cutting tool. The indentation in the upper gauge portion 98 is best seen in Fig. 10, and is formed by the two side surfaces 104 and 106, and the end surface 108. The upper gauge portion 98 is provided on the forward part thereof with a depending leg 110 which is adapted to slidably engage the lower surface of the recess 94, as indicated at 112. The lower gauge portion 100 is cylindrically shaped and formed similar to the upper gauge portion 98. The forward part of the lower gauge portion 100 is provided with an indentation or cut-out portion, similar to that in the upper gauge portion 98, which is indicated by the numerals 114, 116 and 118. The depending leg 110 of the upper gauge portion 98 extends downwardly into the indentation in the lower gauge portion 100. The lower gauge portion 100 is provided with an upwardly extending leg 120 which is similar to the depending leg 110 of the upper gauge portion 98 and, which extends upwardly into the indentation in the upper gauge portion 98. The gauge portions 98 and 100 may be made from any suitable material, but are preferably made from either a suitable plastic, or are die cast from a suitable metal.

In operation, the adjustable kerf gauge 96 is set for the proper width of tool cut, as for example a saw cut, in a manner similar to that used for setting the kerf gauge illustrated in Fig. 1. The machine screw 102 is loosened and a workpiece as 11 is held against a miter gauge as 8 and then while holding the workpiece firmly against the miter gauge, an accurate saw cut, as 10, is made. The miter gauge and workpiece are then withdrawn until the saw cut is disposed adjacently to the forward edge of the adjustable gauge 96. The upper and lower gauge portions 98 and 100, respectively, are then rotated relative to each other until the points or indicating means 119 and 121 are lined up with the edges of the sides of the saw cut 10. The machine screw 102 is then tightened to securely fix the adjustable gauge portions 98 and 100 in place. The gauge setting may be rechecked by making a second saw cut in the workpiece and retracting it to see if the sides of the second saw cut and the adjusted points 119 and 121 are in accurate alignment.

Figure 12:
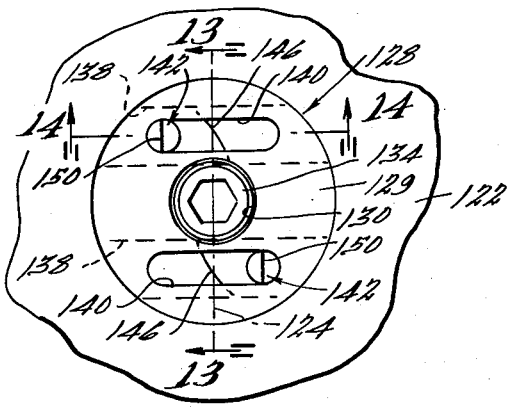
Fig. 12 is a fragmentary plan view of a machine tool work table in which is embedded a fifth embodiment of an adjustable kerf gauge made in accordance with the invention.
Figure 13:
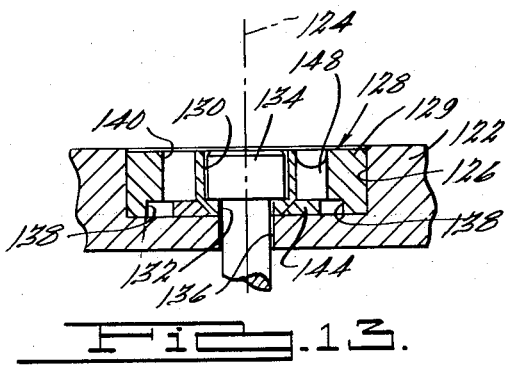
Fig. 13 is an elevational sectional view of the structure illustrated in Fig. 12, taken on the line 13—13 thereof.
Figure 14:
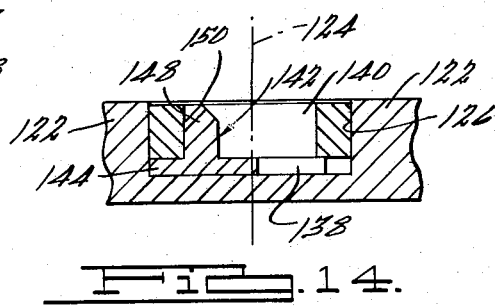
Fig. 14 is an elevational sectional view of the structure illustrated in Fig. 12, taken on the line 14—14 thereof.

A fifth embodiment of the invention is illustrated in Figs. 12, 13 and 14. The numeral 122 designates a fragmentary portion of the work table of a machine tool having a cutting tool, such as a saw blade, with a line of cutting action along the center line 124. The work table 122 is provided on the upper surface thereof with a cylindrical recess 126 in which is carried an adjustable kerf gauge 128. The kerf gauge 128 comprises a housing 129 which is provided with a circular recess 130 on the upper surface thereof communicating with a smaller diameter aperture 132 in the lower end thereof. A bolt 134 is adapted to be seated in the recess 130 and aperture 132, and to threadably engage an aperture 136 in the work table 122 to releasably secure the kerf gauge 128 in place.

The adjustable kerf gauge 128 is provided with a pair of spaced transverse slots as 138 on the lower surface thereof and with a pair of spaced transverse slots as 140 extending downwardly from the upper surface thereof and communicating with the slots 138. The slots 138 and 140 are adapted to slidably receive a gauge pointer as 142, which is provided with a base portion 144, adapted to slide in the slot 138 and which has the inner and outer ends thereof curved as at 146 to match the outer shape of the gauge housing 129. Extending upwardly from each gauge pointer base 144 is a vertical portion 148 adapted to slide in one of the transverse slots 140 and having an upper apex or indicating means 150 disposed parallel to the kerf centerline 124. The gauge pointers 142 may be made from any suitable material, but are preferably made from either a suitable plastic, or are die cast from a suitable metal.

In operation, the adjustable kerf gauge, illustrated in Figs. 12 through 14, is adjusted in a manner similar to that employed for the adjustable kerf gauge shown in Fig. 1. The machine screw 134 is first loosened. A workpiece is then firmly held against a miter gauge set at 90° to the centerline of cutting action 124, and the workpiece is then moved forward against the cutting tool, such as a saw blade, to make a cut therein. The workpiece is then withdrawn from the cutting tool until the cut in the workpiece is disposed over the kerf gauge 128. The gauge pointers 142 are then adjusted so as to have the indicating apexes 150 thereof line up exactly with the sides of the tool cut in the workpiece. The gauge pointers 142 are then secured in their adjusted position by tightening the machine screw 134. The setting of the gauge pointers 142 can be rechecked by making a second cut in the workpiece and retracting it to see if the sides of the cut and the adjusted gauge pointers 142 are in accurate alignment.

Figure 15:
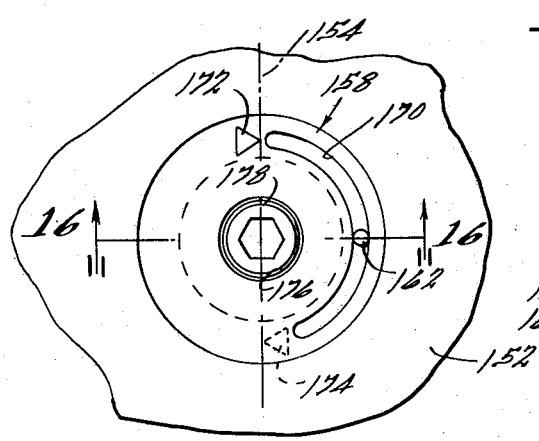
Fig. 15 is a fragmentary plan view of a machine tool work table in which is embedded a sixth embodiment of an adjustable kerf gauge made in accordance with the invention.
Figure 16:
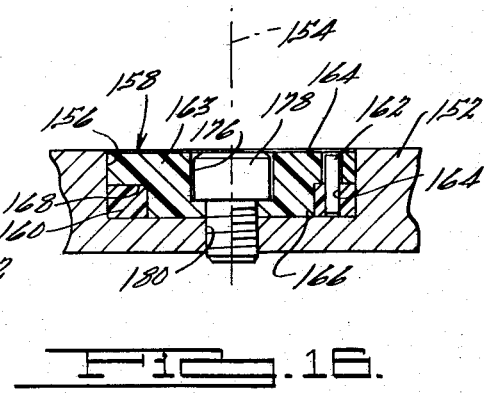
Fig. 16 is an elevational sectional view of the structure illustrated in Fig. 15, taken on the line 16—16 thereof.

A sixth embodiment of the invention is illustrated in Figs. 15 and 16. The numeral 152 indicates a fragmentary portion of the work table of a machine tool having a cutting tool, such as a saw blade, the centerline of the cutting path of which is generally indicated at 154. The work table 152 is provided with a cylindrical recess 156 on the upper surface thereof in which is rotatably mounted a kerf gauge, generally designated as 158. The kerf gauge 158 comprises a lower ring portion 160 rotatably mounted in the cylindrical recess 156 and carrying on one side thereof a vertically disposed pin 162. The pin 162 is carried in aperture 164 and may be suitably fixed therein as by a press fit. As is best seen in Fig. 16, the upper gauge portion 163 includes a stepped diameter cylinder with an upper enlarged diameter portion 164 and a lower reduced diameter portion 166 joined by a shoulder 168. The shoulder 168 is adapted to slidably seat on the upper surface of the lower ring portion 160 and the lower reduced diameter portion 166 is adapted to slidably engage the inner diameter of the lower ring portion 160. The upper gauge portion 163 is provided with a simi-circular groove 170 which extends therethrough and is adapted to slidably receive the upper portion of the vertical pin 162.

The upper cylindrical gauge portion 163 and the lower ring portion 160 are preferably made from any suitable transparent material such as a clear plastic. The upper gauge portion 163 is provided with a pointer, or indicator means, as 172 on the lower surface thereof. The indicating means 172 may be formed integral with the upper gauge portion 163 or it may be formed separately and fastened on after the upper portion is formed. Preferably, the indicating means 172 is cast on the underside of the upper gauge portion 163 and filled with some suitable red or black material. The lower ring portion 160 is provided with a pointer, or indicating means, as 174, which is similar to the pointer 172 and which is preferably cast on the upper surface thereof and filled with some suitable red or black material. The upper gauge portion 163 is provided with a stepped aperture 176 therethrough in which is mounted a machine screw 178 adapted to threadably engage the work table 152, as at 180. It will be seen that the screw 178 is adapted to releasably fix the upper and lower gauge portions 163 and 160, respectively, against relative movement.

In operation, the gauge portions 160 and 163, carrying the pointers 172 and 174, are adjusted relative to the centerline 154 of the line of tool cutting action in a manner similar to that for the gauge shown in Fig. 1. The machine screw 178 is loosened and a workpiece is firmly held against a device such as a miter gauge at 90° to the line of cutting action of the cutting tool. The workpiece is then advanced against the cutting tool and after a trial cut has been made in the workpiece, it is retracted to a position adjacent the kerf gauge 158. The upper and lower gauge portions 163 and 160 are then adjusted relative to each other so as to have similar parts on the indicating pointers 172 and 174 aligned with the opposite sides of the kerf or line of cutting action of the cutting tool. The machine screw 178 is then tightened to hold the upper and lower gauge portions fixed in the adjusted position. The setting of the indicating pointers 172 and 174 may be rechecked by taking a second cut on the workpiece and retracting the workpiece to check the alignment of the indicating pointers with the edges of the second cut.

Figure 17:
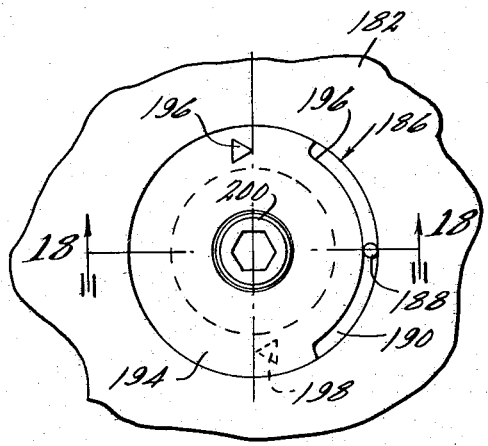
Fig. 17 is a fragmentary plan view of a machine tool work table in which is embedded a seventh embodiment of an adjustable kerf gauge made in accordance with the invention.
Figure 18:
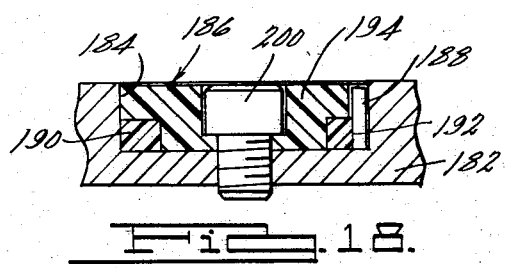
Fig. 18 is an elevational sectional view of the structure illustrated in Fig. 17, taken on the line 18—18 thereof.

A seventh embodiment of the invention is illustrated in Figs. 17 and 18. The numeral 182 designates a fragmentary portion of the work table of a machine tool. The work table 182 is provided with a cylindrical recess 184 on the upper surface thereof in which is mounted an adjustable kerf gauge 186. The kerf gauge 186 is similar in structure and in adjustability and operation to the embodiment of Figs. 15 and 16. The only difference is that the pin 188, which is carried by the lower ring portion 190, is mounted in an aperture on the outer edge of the lower gauge portion instead of inwardly from the outer edge as in the embodiment of Fig. 15. The upper gauge portion 194 is provided with a slot 196 in the upper surface thereof, which is similar to the slot 170 of the embodiment of Figs. 15 and 16 but which is disposed along the periphery of the gauge instead of inwardly from the periphery as in the embodiment of Fig. 15. The gauge portions 190 and 194 are each provided with an indicating pointer 196 and 198, respectively. The kerf gauge 186 may be adjustably locked in place by means of a machine screw 200. The kerf gauge 186 is adjusted in the same manner as the embodiment of Fig. 15.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. An adjustable kerf gauge for woodworking machines or the like having a work table with a hole in the surface thereof and a cutting tool comprising, a pair of members operatively mounted on said table in said hole for movement relative to each other, indicator means on each of said members, the indicator means on one member being adapted to be aligned with one edge of the line of cutting action of said cutting tool and the indicator means on the other member being adapted to be aligned with the other edge of the line of cutting action of said cutting tool, and means operative to releasably secure said members to said table against relative movement, said members and means being no higher than the surface of said table and substantially flush therewith.

2. The invention as set forth in claim 1, wherein said members are adjustable transversely to said line of cutting action, and said indicator means comprises a straight edge disposed parallel to said line of cutting action.

3. The invention as set forth in claim 2, wherein said members are disposed on a common axis transverse to said line of cutting action.

4. The invention as set forth in claim 2, wherein said members are coplanar.

5. The invention as set forth in claim 2, wherein said members are operatively mounted in a housing which is adapted to be embedded in the work table.

6. The invention as set forth in claim 5, wherein said members are adjustably mounted in a slot in said housing with one member being disposed on one side of said line of cutting action and the other member being disposed on the other side of said line of cutting action.

7. The invention as set forth in claim 5, wherein said members are adjustably mounted in a pair of spaced parallel slots in said housing.

8. The invention as set forth in claim 3, wherein said members are adjustably mounted in a transverse slot in the work table and said means operative to releasably secure said members to said table comprises a longitudinal aperture in each of said members, and a releasable fastening means in each aperture extending therethrough and operatively engaging said work table.

9. The invention as set forth in claim 3, wherein said members are adjustably mounted in a transverse slot in the work table and said means operative to releasably secure said members to said table comprises a depending portion on each of said members adapted to slidably extend through an elongated aperture in the work table, and a releasable fastening means operative to engage the depending portions and secure them relative to the work table.

10. The invention as set forth in claim 1, wherein said members are rotatively adjustable relative to each other.

11. The invention as set forth in claim 10, wherein said members are operatively mounted on a common axis of rotation, said axis of rotation being disposed on the centerline of the line of cutting action of the cutting tool.

12. The invention as set forth in claim 11, wherein said members are each provided with an adjacently disposed indentation, and the indicator means on each member is disposed adjacent to the indentation of that member and is provided with an extension thereon which protrudes into the indentation of the other member.

13. The invention as set forth in claim 11, wherein at least the upperly disposed one of said members is formed from a transparent material, said indicator means on the upper member being disposed on a lower surface thereof and abutting the lower member, and said indicator means on the lower member being disposed on the upper surface thereof and abutting said upper member.

14. The invention as set forth in claim 13, wherein said upper member is provided with a semi-circular slot therethrough and said lower member is provided with an upwardly extending portion operatively engaging said slot, whereby said members are limited to a fixed relative movement therebetween.

15. The invention as set forth in claim 14, wherein said slot and upwardly extending portion are disposed inwardly from the periphery of said members.

16. The invention as set forth in claim 14, wherein said slot and upwardly extending portion are disposed along the periphery of said members.

17. In a woodworking machine or the like, the combination of, a work table, a cutting tool operatively mounted on said work table, a cutting tool guard on said work table operative to cover the cutting tool while permitting a workpiece to be cut by the tool, a gauge embedded in and substantially flush with the surface of said work table including adjustable edges adapted to indicate the kerf of said cutting tool, whereby a workpiece may be aligned with the kerf of said cutting tool without removing said guard.

18. In a woodworking machine or the like, the combination of, a work table, a cutting tool operatively mounted on said work table, a cutting tool guard pivotally mounted on said work table and operative to cover the cutting tool while permitting a workpiece to be cut by the tool, a gauge embedded in said work table disposed adjacent to said cutting tool and in alignment with the forward portion of said guard, said gauge including adjustable edges alignable with opposite sides of the kerf cut by said tool being adapted to indicate the kerf of said cutting tool, and said forward portion of said guard being provided with a vertical aperture therethrough, whereby said gauge may be viewed through said aperture to align a workpiece with the kerf of said cutting tool without removing the guard.

19. In a woodworking machine or the like having a table and a cutting tool, a gauge for indicating the kerf of said tool comprising a pair of movable members embedded in the surface of the table and each having an edge alignable with the corresponding one of the opposite sides of the kerf produced by the tool, said edges being visible on the surface of the table.

(References on following page)

References Cited in the file of this patent

UNITED STATES PATENTS

| | | |
|---|---|---|
| 701,724 | Hewitt | June 3, 1902 |
| 703,749 | Stimpson | July 1, 1902 |
| 913,078 | Weber | Feb. 23, 1909 |
| 2,237,556 | Hedgpeth | Apr. 8, 1941 |
| 2,426,780 | Malseed | Sept. 2, 1947 |
| 2,466,325 | Ocenasek | Apr. 5, 1949 |
| 2,515,008 | Humphrey | July 11, 1950 |
| 2,659,159 | Jarrett et al. | Nov. 17, 1953 |